Figure 1:
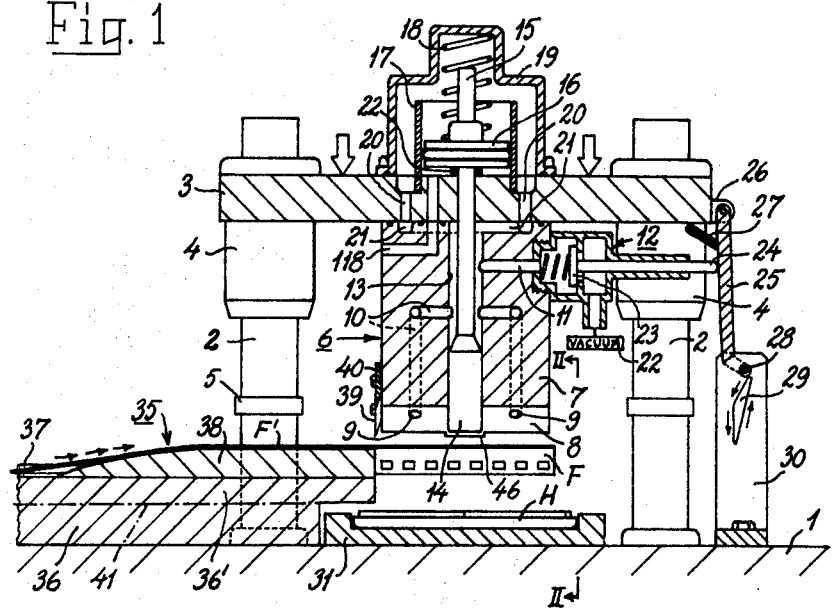

United States Patent [19]

Pettersson

[11] 3,707,755
[45] Jan. 2, 1973

[54] APPARATUS FOR MOUNTING FILM TRANSPARENCIES

[76] Inventor: Sven Goran Pettersson, Weidstrasse 20, Zug, Switzerland

[22] Filed: Aug. 3, 1971

[21] Appl. No.: 168,690

[30] Foreign Application Priority Data

Aug. 17, 1970 Sweden..........................11175/70

[52] U.S. Cl.............29/200 B, 29/200 D, 29/208 E, 29/DIG. 44
[51] Int. Cl. ..........................................B23p 19/00
[58] Field of Search .29/200 B, 203 V, 200 D, 208 E, 29/DIG. 44

[56] References Cited

UNITED STATES PATENTS 3,056,317   10/1962   Huber et al.....................29/DIG. 44

Primary Examiner—Thomas H. Eager
Attorney—Fred C. Philpitt

[57] ABSTRACT

An apparatus for mounting film transparencies onto flat, frame-like carrier members comprises a reciprocatable suction head, to the concave forward end of which the transparencies are supplied in a pre-curved condition to be picked up by suction and delivered to each one of a series of carrier members fed stepwise through the apparatus. Curving of the transparencies is accomplished by feeding them along a track having converging side rails and a wedge-like member between said rails. The transparencies may be severed by cutting from a long film strip just before being picked up by the suction head. A retractable ejector member projecting through the concave end of the suction head provides for positive release of the transparencies from the suction head and their attachment to the carrier members.

9 Claims, 4 Drawing Figures

PATENTED JAN 2 1973 3,707,755

APPARATUS FOR MOUNTING FILM TRANSPARENCIES

This invention relates to an apparatus for mounting film transparencies, i.e., short film strip pieces bearing transparent images, such as diapositives, onto flat frame-like carrier members having each on their one side at least two opposed and inwardly extending tabs between and under which the transparency is to be received. The frame-like carrier members each have a window, which may or may not be glazed, and the transparency retaining tabs on the carrier member may be in the form of tongues or hook-like projections pointing towards each other so as to hook or overlap opposite marginals of the transparency.

Commonly, but not necessarily, the frame-like carrier member is one part or half of a diapositive mount of the kind comprising two interconnectable, frame-like parts or halves, e.g., of the type disclosed in my U.S. Pat. No. 3,203,127, wherein said tabs are tongues formed of and integral with a thin metal sheet secured to the inner side of the frame half, said tongues extending inwardly over shallow recesses in the inner side of the frame half for facilitating the insertion of the longitudinal edges of the transparency under the same.

The main object of the invention is to provide an expedient apparatus for mechanical and more or less automatic mounting or attaching of film transparencies onto carrier members of the kind mentioned above. Among the objects of the invention is also to provide a film transparency mounting apparatus of the kind referred to, which will expose the transparency to the least possible risk of damage; which is capable of speedy, reliable and economical operation; which can, if so required, sever by cutting each transparency from a longer film strip fed into the apparatus in a stepwise manner; and which includes only a few movable parts subjected to wear.

In accordance with this invention these and objects are attained by an apparatus comprising a reciprocatable suction head having a concave, substantially cylindrical forward end surface area, at least one suction aperture in said concave surface area of the suction head, means for selectively connecting said suction aperture to a vacuum source during at least a part of the forward stroke of said reciprocatable suction head, means for temporarily retaining each transparency-receiving carrier member in a fixed position in front of said concave surface area of the suction head at the end of the forward stroke of said head, means for supplying the film transparencies one by one to said concave surface area of the suction head before said head has completed its forward stroke towards the carrier member and for imparting to each transparency thus supplied an initial curvature at least approximately resembling that of said concave surface area of the suction head, at least one ejector member movable in said suction head between a first position, in which it projects beyond said concave surface area of the head, and a second position, in which it is entirely retracted inside said concave surface area, and means for actuating said ejector member in a manner to keep it retracted during at least a part of the forward stroke of said reciprocatable suction head and to cause it to project at the end of said stroke in order to positively transfer the transparency to the carrier member, the curvature of said concave surface area of the suction head being so chosen that the transverse distance between the longitudinal edges of the film transparency held against said area by suction is sufficiently reduced to let the transparency enter between the opposed tabs of the carrier member before said ejector member is projected to flatten the transparency against the carrier member.

As should be understood from this general description of the apparatus, the suction head thereof serves as a means for picking up the transparencies, one at each forward stroke of the head, from a station to which such transparencies are delivered in a pre-curved condition, and for subsequently transferring and properly attaching each transparency to its related carrier member in a purely mechanical way, which is simple, clean and harmless to the transparencies. The attachment of each transparency to its related carrier member is accomplished in a positive manner by the action of the ejector member and entirely independent of the resiliency of the transparency itself, which will result in a reliable and speedy operation of the apparatus.

In a preferred form of the apparatus, the movements of the ejector member is controlled by suction so that the vacuum source required for the operation of the suction head may also be used as a power source for operating the ejector member. Furthermore the apparatus may be provided with means for stepwise feeding of the carrier members in series therethrough, whereby the capacity of the apparatus may be greatly improved. Also, in a preferred form of the apparatus, the transparencies are delivered to the suction head in succession through simple and peculiar means causing them to curve in an appropriate manner during their advance towards the point or station, where the suction head will pick them up one by one.

Figure 3:
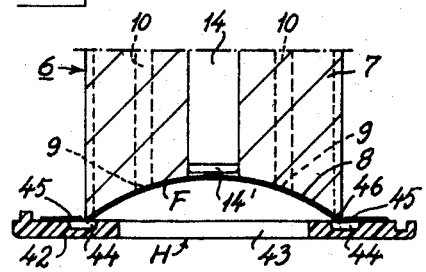
Figure 4:
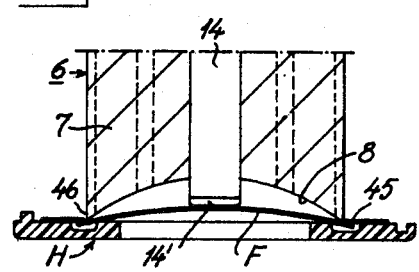
Figure 2:
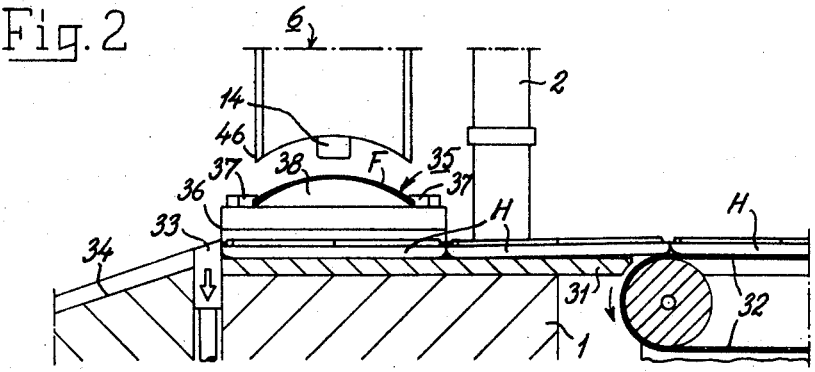

For further elucidation of the invention, an embodiment thereof will now be described with reference to the accompanying drawing, wherein FIG. 1 is a sectional elevation of an apparatus for mounting film transparencies as seen from a line along which the transparencies are fed into the same, FIG. 2 is a partial sectional elevation of the apparatus as seen from the line II—II in FIG. 1, FIG. 3 illustrates in sectional elevation a first step in the attachment of the film transparency to the carrier member, and FIG. 4 illustrates in a similar manner a second step of the same attachment operation.

The apparatus illustrated in the drawing comprises primarily a supporting structure including a bottom plate 1 having two posts 2 secured thereon, said posts serving as guides for a vertically movable plate 3 having sliding sleeves 4 enclosing each one of the guide posts 2. At a suitable level the posts 2 are provided with abutments 5 limiting the downward movement of the plate 3. The plate 3 is vertically reciprocatable by any suitable driving mechanism, not shown. To the bottom side of plate 3 there is secured a transparency transferring member or suction head generally designated by 6 and having a substantially rectangular or square cross-section. More in details the suction head 6 comprises a body 7 having a concave bottom surface area 8 which is curved in one direction only, as shown in FIGS. 2–4, and the curvature of which is so chosen that it will impart to the film transparency to be mounted a suitable bend in order to let opposite edges thereof enter between the tabs or projections of the carrier member, as will appear from the following.

In the concave bottom surface area 8 there are four spaced apertures 9 communicating through passages 10,11 in the interior of the body 7 with a valve 12 mounted on the one side of the suction head. A bore 13 in body 7 opens in the middle of the concave surface area 8 and houses a plunger-like ejector member 14 that is movable between a first position (FIG. 4), in which it projects beyond the concave surface area of body 7, and a second position, in which it is retracted in the body 7. The upper end portion of the bore 13 serves as a connecting passage between the beforementioned passages 10 and 11. The ejector member 14 may or may not have tight fit in the bore 13; if there is a play between the member 14 and the bore 13, this will simply serve as an additional aperture communicating with the valve device 12. The ejector member 14 has a slender stem 15 extending upwardly through and slidably fitting in a hole in the plate 3.

Above the plate 3 the stem 15 is connected to a piston 16 having a relatively large area and being movable with an appropriate seal in a cylinder sleeve 17 attached to the top of plate 3. The sleeve 17 is open at its top and the lower end thereof is in open communication with the atmosphere through a passage 118. The piston 16 is actuated by a spring 18 urging the piston 16, and hence the ejector member 14, downwards, and having its upper end supported against a cap 19 that encloses the cylinder 17 in spaced relationship thereto and seals against the top of the plate 3. Through the interior of the cap 19 and through passages 20 and 21 in the plate 3 and in the upper part of the body 7 the upper end of the cylinder sleeve 17 openly communicates with the upper end of the bore 13 and, hence, with the valve 12. Interposed between the bottom side of the piston 16 and the top side of the plate 3 is an elastic ring 22 for softening the impact of the piston against the plate 3. The upward stroke of the piston is restricted by the cap 19, against which the upper end of stem 15 abuts.

The valve 12 connects the passage 11 in the suction head 6 to a vacuum source, diagrammatically illustrated at 22, and includes a valve member 23 that is movable against the action of a return spring and has an actuating stem 24 protruding on the outside of the valve housing. The stem 24 is actuatable by a lever 25 hinged to a bracket 26 on plate 3 and normally held in engagement with the outer end of the stem by a weak spring 27. The lower, free end of the lever 25 carries a small roller 28 that co-operates in a predetermined manner with a cam member 29 during the vertical movements of the plate 3, said cam member being stationary mounted on a support 30 secured to the bottom plate 1. The cam member 29 is so shaped that it will cause the lever 25 to press the valve 24 inwards during the downwards stroke of the suction head 6, thereby opening the communication between the bore 13 in the body 7 and the vacuum source 22, but when the plate 3 with head 6 moves upwards from its lowermost position, the roller 28 will pass on the outside of the cam member 29 and thus remove the lever 25 from the stem 24 permitting the valve 12 to close. The arrangement in such that the valve 12 will open already when the head 6 is moved a short distance downwards and will close again just when the head reaches its lowermost position, in which it is halted for a short period of time by the driving mechanism of the plate 3. When the vacuum source 22 is thus connected with the bore 13, suction will occur through the apertures 9 in the concave surface area 8 and at the same time the piston 16 will be lifted against the action of the spring 18 for retracting the ejector member 14.

Under the vertical path of the suction head 6 on the table 1 there is provided a channel-like guiding track 31 for a series of carrier members H, which are successively to receive one film transparency F each. In the track 31 the carrier members H are laterally guided to pass under the concave surface area 8 of the suction head 6. The carrier members H are fed to the track 31 by a driven belt conveyor 32, but other types of feeding means may be used, if desired. The carrier members H are fed towards a movable stopper 33 (FIG. 2) at the outlet end of track 31, and this stopper will temporarily retain each carrier member H in a fixed position under and in front of the concave lower end of the suction head 6. As soon as the halted carrier member has received its transparency F, the stopper 33 is momentarily lowered to let the carrier member with its attached transparency be pushed out by the next carrier member. In the illustrated form of apparatus, the carrier members leave through an inclined chute 34 but this is not necessary. The feed of the carrier members H thus takes place in a stepwise manner and, of course, with a timing determined by the strokes of the suction head 6, it being understood that the head should be on its way upwards when the stopper 33 is lowered.

The film transparencies F to be mounted are delivered to the suction head 6 along another feed track, generally designated by 35, which comprises a supporting block 36 extending partially in over the feed track 31 for the carrier members H. On top of this supporting block 36 there are attached a pair of fixed guide members or rails 37 having undercut or grooved inner faces, with which the two opposite longitudinal edges of the film transparencies to be mounted engage in a guiding manner. The rails 37 converge at least along a part of their length in the direction of feed of the transparencies, i.e., from left to right in FIG. 1, whereby the transparencies advancing along the track 35 are caused to curve transversally. Between the rails 37 on top of the supporting block 36 there is also provided a wedge member 38 initiating and ensuring the proper curving of each transparency in the same direction as the concavity of the surface area 8 of the suction head 6. It is desirable that each transparency F should have at least approximately the same curvature as the concave surface area 8 when reaching the outlet end of the feed track 35 adjacent the path of the head 6.

While being advanced step by step along the feed track 35 with the aid of appropriate driving means, which are not shown but which may advantageously include toothed wheels engaging with the perforations normally provided in the marginal portions of the film strip from which the transparencies are usually formed, the transparencies F are preferably not yet separated from each other but form longer or shorter film strips F'. As a result of the beforementioned transversal curving, this film strip is stiffened so that it becomes possible to let the foremost transparency F project freely beyond the end of the feed track 35 and thus into the path of the vertically movable suction head 6. The transparency F is thus introduced into the path of the suction head 6 in a cantilever fashion at a level between the highest and the lowest position of the concave surface area 8. At the outlet end of the feed track 35 the wedge member 38 forms a support for the film strip F', and this support constitutes, in co-operation with a cutting edge 39 on the suction head 6, a severing device for separating the transparency F to be mounted from the remainder of the film strip F'. The cutting edge 39 is provided on a knife member 40 that is detachably mounted on the suction head 6, whereby it may easily be removed for sharpening.

In order to make the described apparatus adapted for the handling and mounting also of transparencies already separated from each other and fed forward in succession along the track 35, the supporting block 36 may be divided along the broken line 41 and its upper part 36' be made horizontally reciprocatable to move in under the suction head 6 in the longitudinal direction of the track 35. If so, the driving mechanism for the plate 3 must, of course, be formed in a manner to halt the downward movement of the suction head 6 for a short moment just when the concave surface area 8 is immediately above the pushed forward wedge member 38 with the curved transparency lying thereon. Then the suction head will pick up the already separate transparency without the knife 40 coming into action, whereupon the upper part 36' of the block 36 is returned to its original position shown in FIG. 1 and the downward stroke of the suction head is continued for transferring the transparency to the carrier member H as before. Of course, the feeding in of the transparencies must be synchronized with the other operational steps of the apparatus, irrespective of whether the transparencies F are separated from each other in the apparatus or are fed to the latter in an already separated condition.

In FIGS. 3 and 4 there is shown in a simplified manner, how the flat frame-like carrier member H for receiving the transparency F may be designed. In this case the carrier member represents the one half of a diapositive mount or frame comprising two separable pieces, and it consists of a frame-like base member 42 of synthetic resin formed with a centrally located, rectangular opening 43. On either side of this opening shallow recesses 42 are provided in the upper face of the base member 42 and on top of this member there is attached a thin but relatively stiff metal sheet forming a pair of tabs or tongues 45 pointing towards each other and extending inwardly over the recesses 44. Under these tabs 45 the two opposite side edges of the transparency F are to be inserted by means of the suction head 6 and its ejector member 14. This is accomplished in the following manner: When the concave bottom end of the suction head 6 on the downward stroke of the latter comes into contact with the transparency F supplied from the feed track 35, the ejector member 14 is already retracted in the head, and the apertures 9 in the concave surface area 8 are in communication with the vacuum source. Accordingly, the transparency F will be sucked against the concave surface area 8 and be brought along by the suction head, when the latter continues its downward movement to its end position shown in FIG. 3, in which the side edges of the transparency F are in a position immediately below the tabs 45 of the carrier member H. If now the width of the tabs 45, perpendicularly to the plane of the drawing, is smaller than the length of the transparency F in the same direction, the suction head 6 must on either side of the concave surface area 8 have slightly extended edge portions 46 of such a shape that they can force portions of the transparency marginals down under the tabs 45. At the time when the suction head 6 reaches its lowermost end position, the connection with the vacuum source is shut off through closing of the valve 12. Thereby the transparency F will no longer remain sucked against the concave surface area 8 of the head 6, and at the same time the ejector member 14 is forced downwards by the spring 18, because the piston 16 is no longer actuated by suction. As a result, the ejector member 14 will push the transparency F away from the concave surface area 8 and straighten it out so that its edges are forced in under the tabs 45 of the carrier member H as shown in FIG. 4. When the suction head 6 is subsequently moved upwards, the transparency F will remain attached to the carrier member H, and the mounting operation is completed. To prevent the ejector member 14 from damaging the transparency F during the attachment thereof to the carrier member, it may suitably be made entirely of a soft, non-scratching material, e.g., plastic, or else the ejector member may be provided with an end liner 14' of such a soft material, as has been indicated in FIGS. 3 and 4. In certain cases it may also be advantageous to make the suction head 6 of such a relatively soft and non-scratching material, or at least to provide the concave surface area 8 with a coating of soft and possibly porous material, such as plastic, rubber, foam plastic, cloth or the like.

Several modifications as to the details are, of course, thinkable in the apparatus now shown and described without jeopardizing the proper operation thereof. Thus, the design of the valve 12 and its actuating mechanism may be varied within wide limits and, if desired, the valve itself may be stationary mounted on the frame structure and instead be actuated by a cam member partaking in the reciprocating movements of the suction head. It is also possible to let the suction head 6 reciprocate along a curved path instead of a linear one as illustrated, but all such possibilities are believed to be obvious to the man skilled in the art when he has acquainted himself with the form of the invention described hereinbefore.

I claim:

1. An apparatus for mounting film transparencies onto flat, framelike carrier members having each on their one side at least two opposed and inwardly extending tabs between and under which the transparency is to be received, said apparatus comprising: a reciprocatable suction head having a concave, substantially cylindrical forward end surface area; at least one suction aperture in said concave surface area of the suction head; means for selectively connecting said suction aperture to a vacuum source during at least a part of the forward stroke of said reciprocatable suction head; means for temporarily retaining each transparency-receiving carrier member in a fixed position in front of said concave surface area of the suction head at the end of the forward stroke of said head; means for supplying the film transparencies one by one to said concave surface area of the suction head before said head has completed its forward stroke towards the carrier member and for imparting to each transparency thus supplied an initial curvature at least approximately resembling that of said concave surface area of the suction head; at least one ejector member movable in said suction head between a first position, in which it projects beyond said concave surface area of the head, and a second position, in which it is entirely retracted inside said concave surface area; and means for actuating said ejector member in a manner to keep it retracted during at least a part of the forward stroke of said reciprocatable suction head and to cause it to project at the end of said stroke in order to positively transfer the transparency to the carrier member; the curvature of said concave surface area of the suction head being so chosen that the transverse distance between the longitudinal edges of the film transparency held against said area by suction is sufficiently reduced to let the transparency enter between the opposed tabs of the carrier member before said ejector member is projected to flatten the transparency against the carrier member.

2. An apparatus according to claim 1, wherein said ejector member is spring-actuated towards its first, projected position and is connected to piston means operative to retract said ejector member to its second position.

3. An apparatus according to claim 2, wherein said piston means are actuatable by suction to retract said ejector member, and wherein said means for selectively connecting said suction apertures of the suction head to a vacuum source are adapted to simultaneously connect said piston means to the same vacuum source so as to keep said ejector member retracted when suction is applied to hold the transparency against said concave surface area of the suction head.

4. An apparatus according to claim 1, wherein said means for temporarily retaining each transparency-receiving carrier member in a fixed position comprise a channel-like guiding track for a series of successive carrier members and means for feeding said members stepwise along said track in a manner to halt each carrier member in a predetermined position therein.

5. An apparatus according to claim 1, wherein said means for supplying the film transparencies to said concave surface area of the suction head comprise a feed track for said transparencies, said track being laterally confined by guide members converging in the direction of transparency feed along at least a part of the length of the track and adapted to engage opposite longitudinal edges of said transparencies in a manner to cause the latter to curve transversely when they are moved along said feed track, and means intermediate said guide members for initiating curving of the transparency in a direction corresponding to the concavity of said forward end surface area of the suction head.

6. An apparatus according to claim 5, wherein said means for supplying the transparencies to said concave surface area of the suction head are adapted to project the transversally curved transparencies in a cantilever-fashion into the path of the reciprocatable suction head.

7. An apparatus according to claim 6, wherein said feed track for the transparencies has an outlet end located beside and close to the path of said reciprocatable suction head and comprises a supporting member at said outlet end, and wherein a cutting instrument is mounted on said reciprocatable suction head for cooperation with said supporting member in a manner to sever the transparency about to be mounted from a longer film strip advanced stepwise along said feed track.

8. An apparatus according to claim 1, wherein said means for selectively connecting said suction aperture of the suction head to a vacuum source comprise valve means actuatable by cam means in response to the reciprocating movements of the suction head.

9. An apparatus according to claim 1, wherein at least the outer end portion of said ejector member is made of a soft, nonscratching material.

* * * * *